Nov. 4, 1947.  H. J. SHARP  2,430,251

FLUID PRESSURE ROTARY MOTOR WITH SPRING ACTUATED SWINGING VANES

Filed Sept. 7, 1944  4 Sheets-Sheet 1

Inventor:
HENRY J. SHARP.
By Lew Edelson
Attorney.

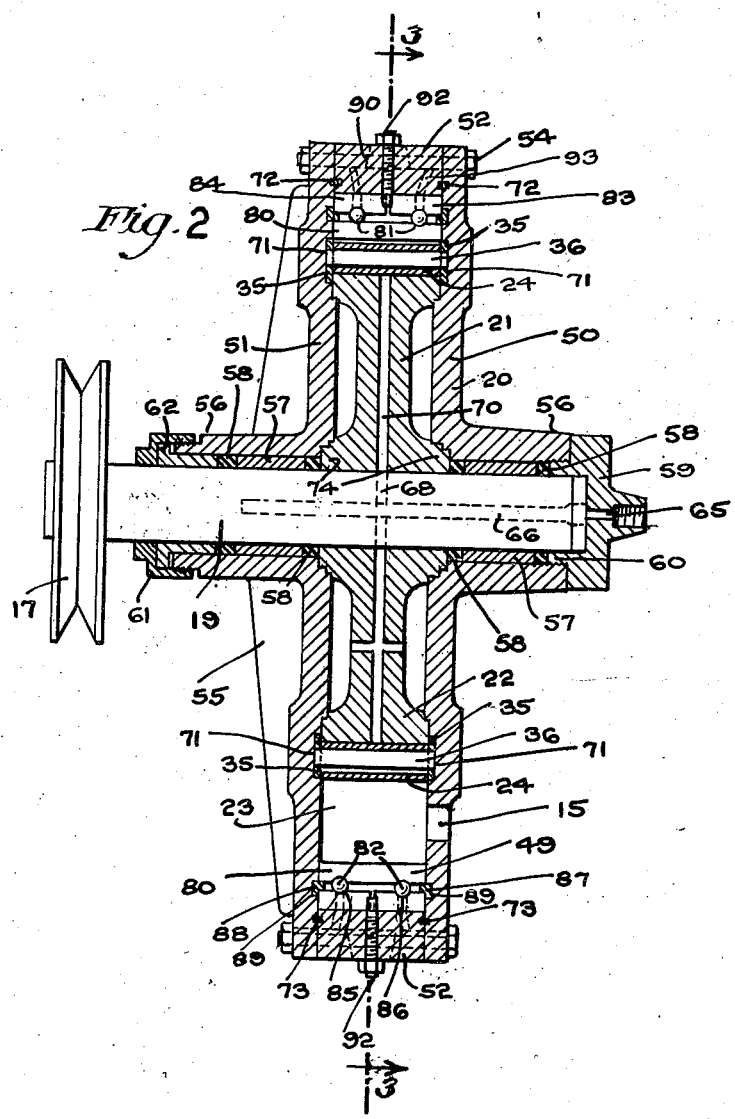

Inventor
HENRY J. SHARP

Inventor:
HENRY J. SHARP
By Leo Edelson
Attorney

Patented Nov. 4, 1947

2,430,251

UNITED STATES PATENT OFFICE 2,430,251

FLUID PRESSURE ROTARY MOTOR WITH SPRING ACTUATED SWINGING VANES

Henry J. Sharp, Upper Darby, Pa.

Application September 7, 1944, Serial No. 553,083

3 Claims. (Cl. 121—95)

The present invention relates to fluid impelled rotary motors or engines and is more particularly directed to a fluid operated rotary motor which is so constructed and designed that the friction power losses within the engine are reduced to a minimum with the consequence that temperature rises are low, the efficiency of the engine is relatively high and as a result the ratio of weight of the engine to the power delivered by it is low.

The present invention relates particularly to the type of engine which is operated by compressed fluids and which consists essentially of a fixed casing or stator and a rotary element or rotor disposed within said casing. In this type of motor or engine the rotor is eccentric with reference to the stator and is provided on its periphery with a series of pivoted vanes or impellers. The outer ends or faces of such vanes move against the inner cylindrical face of the stator while the vanes receive the pressure of the operating fluid and are impelled thereby to rotate the rotor.

The vanes generate considerable friction and heat and also cause substantial wear on the cooperating parts. It is the aim of the present invention to minimize these sources of power loss in the engine which in this type of apparatus known hitherto greatly reduce the efficiency of the engine.

For these purposes, the present invention minimizes the relative motion between the operating ends of the impeller vanes and the cooperating face of the stator without reducing the rotation of the rotor.

A still further object of the present invention is to provide a structure of the type described and in which the relative motion between the impeller vanes and the cooperating face of the stator is at a minimum where the pressure is at a maximum and where the friction losses would otherwise be at a maximum.

To accomplish these purposes the present invention provides the stator with an annular rotary element which is rotated by reason of the pressure exerted against its inner face by the impeller vanes of the rotor. Preferably, one or more races of ball bearings are interposed between this rotary annular element and the fixed annular portion of the stator. As a consequence of this organization the annular rotary element rotates with the rotor on the ball bearings.

Another object of the present invention is to provide readily operable means for adjusting the assembly to compensate for wear of the impellers, and of the bearing races.

Another object of the present invention is to provide a structure of the type described which may be manufactured, assembled and repairs made with great facility.

With the above objects in view, the invention further resides in the combination and arrangement of parts and in the details of construction herein described and claimed; it being understood that the specific embodiments of the invention described herein are illustrative and that modifications thereof falling within the scope of the appended claims will become apparent to persons skilled in the art.

In the accompanying drawings:

Fig. 2 is a sectional view on line 2—2 of Fig. 1.

Figure 1:
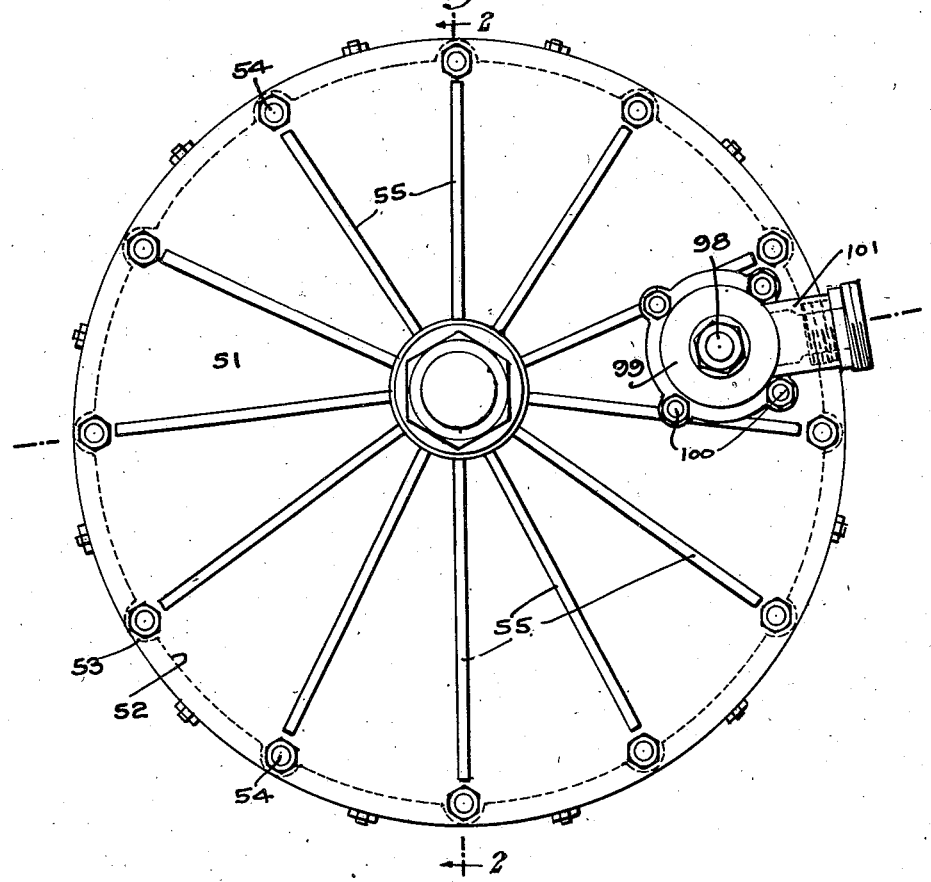
Figure 1 is a plan view of the preferred embodiment of the invention.
Figure 4:
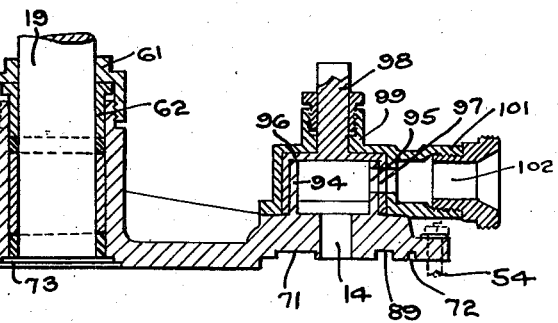
Fig. 4 is a sectional view of one of the plates of the stator.

Referring particularly to Figure 2 of the drawings, the reference character 20 indicates the stator of the rotary engine embodying the present invention and the reference character 21 indicates the rotor of the engine.

Figures 5, 6:
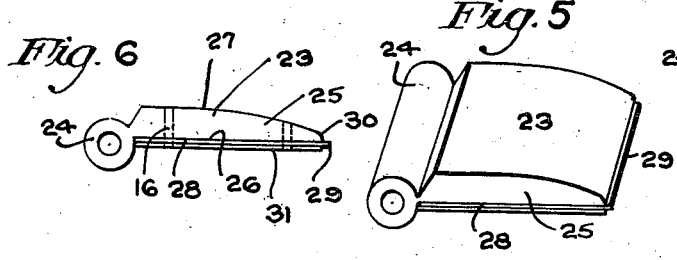
Fig. 5 is a perspective of one of the impeller vanes.
Fig. 6 is an edge view of the same.
Figure 7:
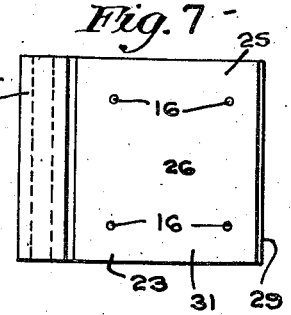
Fig. 7 is a plan view of the same.
Figure 8:
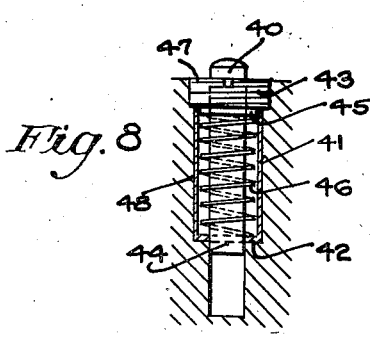
Fig. 8 is an enlarged showing of the detail.

The rotor 21 comprises a circular disk 22 provided with a central shaft 19 spliced or keyed to the rotor, the shaft 19 having a drive pulley 17 mounted at one end for the delivery of power generated by the motor. The impeller vanes are shown in detail in Figures 5, 6 and 7. As shown in the present invention eight such vanes 23 are mounted on the periphery of the rotor disk 22. It will be understood, however, that the number of the impeller vanes may be varied depending upon the capacity and rate of revolution of the engine. Each vane 23 which may be in form of a casting comprising a bearing sleeve 24 at its heel and an integral suitably shaped vane portion 25. The portion 25 comprises a flat face 26 and a suitably curved face 27. The flat face 26 carries a layer of flexible and yieldable material such as leather or the like 28, which has a portion 29 extending beyond the operating edge 30 or the toe of the vane. The leather gasket 28 also extends beyond the lateral edges of the vane. A piece of sheet metal 31 is disposed over the gasket 28 and the elements 25, 28 and 31 are held together by means of screws or pins 16. The gasket 28 is readily replaceable.

The rotor disk 22 is provided with a plurality of recesses or seats 32 designed to receive the vanes 23 when the same are in their collapsed position as shown at 33 and 34. The curvature of the outer face 27 is of the same radius as the disk 22 with the result that when the vanes are in their collapsed positions shown at 33 and 34, these faces 27 are substantially continuous with the portions 18 of the periphery or cylindrical face of the disk 22.

The recess 32 is provided at one end with a transverse depression to receive the cylindrical bearing portion 24 of the vane. The rotor is also provided on each face thereof and near the periphery with rings 35 having a series of apertures to receive the pins 36 passing through the bearings 24 of the vanes 23. The pins 36 may be slightly hammered or swaged over the rings 35 so that the same are held in assembly with the disk 22 and the vanes 23. Thus the disk 22, the rings 35, the vanes 23 and shaft 19 form a single and unitary assembly.

In operation it is desired to provide a mechanical means for initially displacing each vane from its collapsed position, thereby permitting the ingress of compressed fluid between the vane and its seat 32, which causes the pressure of the fluid to be applied against the flat face of the vane and maintain its free edge 29 in engagement with the stator. For this purpose the present invention provides a spring pressed ejector pin 40 which presses against the flat or inner face of the vane 23 when it is in its collapsed position and serves to move it into its slightly open condition as shown at 37.

The ejector pin 40 is the operating element in a small structural assembly which includes a cup shaped element 41 having an apertured bottom 42 and provided with an enlarged and exteriorly threaded outer end 43. The pin 40 is disposed within the cup 41 and its lower end 44 passes through the opening in the bottom 42. The pin 40 is also provided with an enlargement 45 at its other end which somewhat approximates the inner diameter of the cup 41. A helical spring 46 is disposed between the collar 45 and the bottom 42. The portion 43 of the cup 41 is preferably provided with an inwardly directed projection 47 which serves as a stop for the outward movement of the ejector 40. This unitary assembly is housed in a well 48 formed in the seat 32 near the heel of the vane. The outer end of the well 48 is interiorly threaded so as to receive the exterior threads of the portion 43. The ejector assembly is preferably so mounted within the well 48 that the end face of the cup 41 is substantially flush with the seat 32 and consequently the vane impellers 23 may be seated flush against the seats 32 as shown in the positions 33 and 34, and the spring 46 is thus compressed, so that the pin 40 may act upon the vane to move it away from the seat 32 and keep it in this position until it passes the fluid pressure inlet. The fluid pressure will then take up where the ejector pin left off and will maintain the vane in sealing engagement with the stator and by its pressure against the vane, will rotate the rotor.

The stator provides a pair of journal boxes for the ends of the shaft 19. The journal boxes are eccentric of the periphery of the circular stator. The interior of the stator which receives the rotor is of greater diameter than the rotor disk 22. When the rotor and stator are assembled a crescent shaped space 49 is made available, within which the vanes 23 of the rotor operate to move from the collapsed position shown at 34 to a fully extended position and then to the collapsed position 33. This crescent shaped space has an inlet 14, preferably in the thin end of one of its horns and an outlet 15 in a region immediately past the maximum width of the crescent. The maximum width of the crescent is preferably such that the vanes 23 when fully extended occupy a position short of radial.

In operation the vanes with the extending portions of the gasket form what may be termed movable diaphragms that effect a seal against the adjacent faces of the stator. Thus the space between each pair of vanes, sealed at each end by the gaskets 28, forms a chamber which expands to a maximum during one half a revolution and contracts during the second half.

The stator embodies an essential feature of the present invention in that it contains means which cooperate with the rotor and particularly with the impeller vanes so as to minimize the friction, heat and other power losses. Broadly stated the stator of the present invention comprises an annular surface element supported by antifriction ball bearings, and this element is free to move with the vanes 23. This phase of the invention will be more fully understood from the following detailed description of the structure and organization of the stator.

The stator 20 comprises a pair of disks 50 and 51, and a cylindrical spacer 52 disposed between the peripheral portions of the plates 50 and 51. The specific shape and construction of the annular element 52 is more clearly shown in Figure 9 of the drawings. It will be seen that this element has a series of transverse external ribs 53 each provided with a longitudinal passage therethrough which receive the bolts 54 which secure the plates 50 and 51 and the spacer 52 together and serve to hold the entire engine in assembled relation.

The plate 51 is shown as being provided with a series of radial reinforcing ribs 55 and if desired the plate or disk 50 may also be provided with such reinforcing ribs. The disks or plates 50 and 51 are circular and have a diameter substantially greater than the diameter of the rotor 21. While the rotor disk 22 is provided with a shaft which is concentric with its periphery, the journal boxes 56 of the stator are eccentric with reference to the periphery of the stator. The journal boxes 56 have bronze bushings 57 and packing glands 58 to prevent the escape of fluid lengthwise of the rotor shaft 19. The journal box receiving the stub end of the shaft 19 is provided with a closure cap 59. The cap 59 also has an integral sleeve portion 60 which is exteriorly threaded and engages the interior threads in the journal box. The portion 60 also serves as a follow up for the packing gland 58 and generally serves to provide an effective seal at this end of the shaft. At the opposite end of the shaft 19, namely, the end that extends outwardly and serves to transmit the power, the closure cap 61 threads on to the exterior of the journal box 56 and the follower 62 is disposed within the closure cap 61. The follower 62 serves to press against the packing gland 58 and to provide an effective seal at this end of the assembly. The closure cap 59 is provided with a central passage 65 which registers with an axial passage 66 in the shaft 19. The passage 66 also has radial passages 67, 68 and 69. Lubricating oil under pressure supplied to the passage 65 therefore enters the passage 66 and is fed through the radial passages 67 and 69 to the bearings 57. The radial passages 68 are in registry with radial passages 70 in the rotor disk 22 which supply lubrication to the bearings 24 of the impeller vanes 23.

The inner faces of the stator disks 50 and 51 are provided with annular recesses 71 concentric with the journal boxes 56, these recesses being designed to receive the annular rings 35 mounted on the peripheral portions of the rotor disk 22. The inner faces of the stator disks are also provided with annular recesses 72 which receive packing glands 73 interposed between the disks and the annular sealing element 52. The plates or disks 50, 51 are each provided with a shoulder enlargement at the inner end of the journal boxes 56, these serving to receive correspondingly shaped bosses 74 in the center of each face of the rotor disk 22 and thereby assisting in the proper centering of the units when the same are assembled.

In apparatus of the type to which the present invention is directed it has been common practice to cause the free ends of the impeller vanes to operate against the fixed annular surface of the stator. Such operation has caused excessive friction, excessive temperature rise, and excessive wear of the cooperating parts, with a consequent lowering of the efficiency of the entire apparatus. One of the essential features of the present invention resides in providing a structure in which these difficulties are minimized. In the present invention, therefore, antifriction means are interposed between the impeller vanes and the fixed annulus 52. Such antifriction means provide an effective seal by contact with the toe 30 of the vanes and with the portion 29 of the leather gasket. The antifriction means of the present invention, however, is free to rotate and is rotated by the force exerted by the pressure of the vane 23 against its face.

Figure 3:
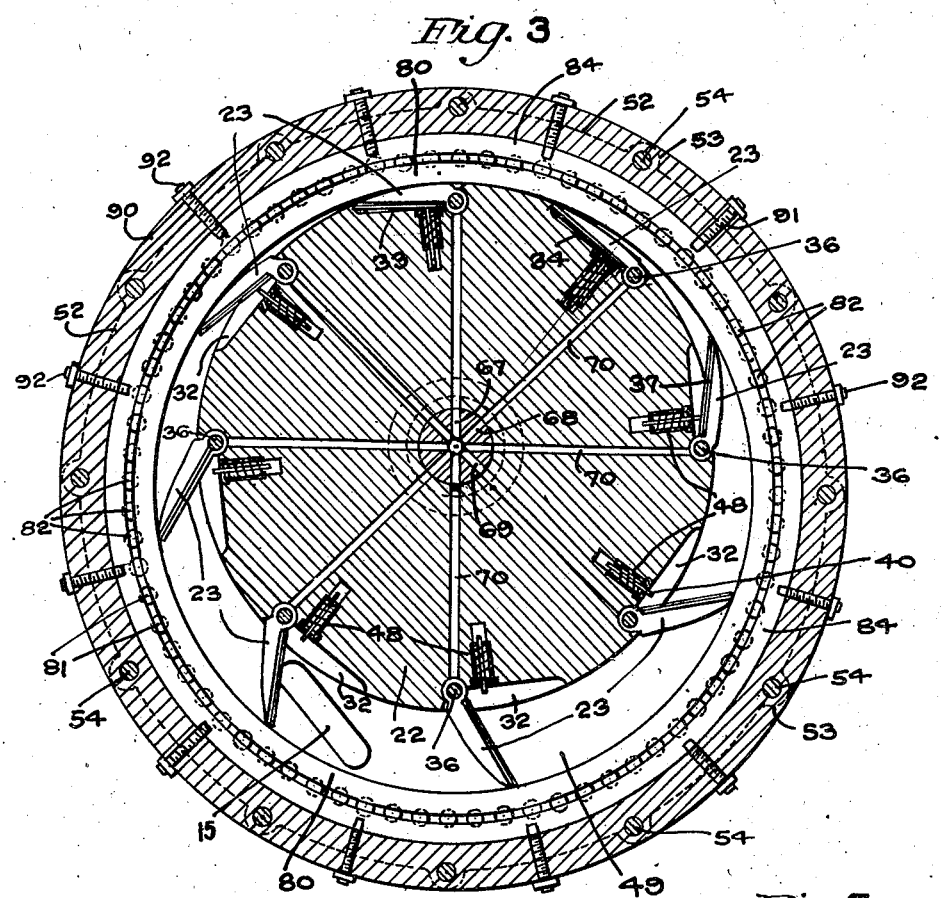
Fig. 3 is a sectional view on line 3—3 of Fig. 2.

The antifriction means is part of the stator assembly. Its essential element is the revoluble annulus indicated by the reference character 80. Its inner diameter is such that it exceeds the diameter of the rotor disk 22 by an amount approximately the same as the length of the impeller vane 23 extending beyond the periphery of the rotor disk 22. This arrangement is preferably such as to prevent the impeller vanes from ever assuming the radial position. Thus the greatest extension outward of the impeller vanes 23 is best illustrated in Fig. 3 by the two lowermost vanes. The inner face of the revoluble annulus 80 is preferably polished or machined so as to reduce the friction and its outer face is provided with a pair of annular grooves 81 receiving ball bearings 82.

In order to provide for a ready and facile adjustment against possible wear of the revoluble ring 80 or its grooves 81 a pair of rings 83 and 84 are interposed between the revoluble ring 80 and the sealing ring 52. Each of the rings 83 and 84 is provided on its interior face with an annular groove 85, 86 respectively which cooperate with the grooves 81 to receive the ball bearings 82. Preferably the grooves 85 and 86 are somewhat deeper than the grooves 81. Annular packing glands 87 and 88 are disposed in the recesses 89 provided for this purpose in the faces of the stator disks 50 and 51. The revoluble ring 80 bears against the one face of the packing glands 87 and 88 while the rings 83 and 84 bear against the other face of the packing glands 87 and 88.

Figure 9:
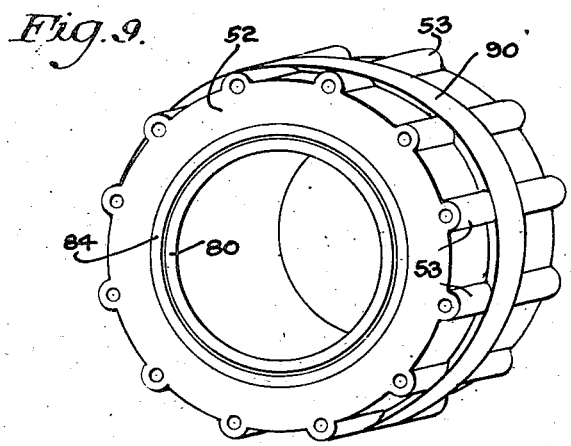
Fig. 9 is a perspective view of a part of the fixed cylindrical portion of the stator.

The annular element 52 is provided with a circumferential rib 90 which is shown in Fig. 9. The rib 90 has interiorly threaded radial passages 91 which receive screws 92. The screws 92 are tapered at their free ends and extend into registering recesses in the adjacent faces of the rings 83, 84. When the ball races have worn the screws 92 are turned slightly inwardly and the tapered ends will operate to separate the rings 83, 84. This will produce a more positive engagement between the rings and the ball bearings for the ball bearings will then be engaged more firmly by one or the other side of the races. The passages 93 provide for the introduction of lubricating oil to the ball bearing.

In operation the fluid pressure is exerted against the flat faces 28 of the vanes 23 and the rotor is rotated in the clockwise direction in Fig. 3. The space between each pair of vanes may be said to constitute an expansible chamber, for as the rotor rotates this space is enlarged by reason of the eccentric arrangement of the rotor with reference to the stator. Thus the pressure within each chamber is continuously reduced until the outlet 15 is reached when the fluid, compressed air or steam, exhausts. The pressure causes the vane to press against the inside face of the annulus 80. The annulus 80 will thus rotate in the same direction as the rotor. It should be noted that the linear speed of the toe of the extended vane as shown at the bottom of Fig. 3 is considerably in excess of the linear speed of the top of the rotor. Thus even when there is no differential speed at the bottom there will always be differential speed between the rotor and annulus 80 at the top of the rotor. It is in the high pressure zone, which is in the space between the inlet and outlet and subtends an angle only somewhat greater than one quadrant, where the friction losses occur. In the remaining three quadrants the vanes exert no substantial pressure against the stator. It is, therefore, desirable to minimize relative motion between the vanes and annulus 80 in the high pressure zone and permit relative movement in the low pressure zone. It will now be understood that the present construction provides for such distribution of relative motion with the consequence that friction losses are minimized or greatly reduced.

It is not necessary that the linear movement of the annulus 80 should approximate the toe of the vane when extended. For the several vanes operating in the high pressure zone are variously extended and their toes operate at different linear speeds. The linear speed of the annulus 80 will thus vary with the operating pressures, the rate of rotation of the rotor and the number of vanes in the high pressure zone. In all cases however the present invention provides for minimizing the relative motion between the vanes and the annulus 80 in the zone where the greatest friction losses commonly occur.

Even in the low pressure zones the relative motion between the annulus 80 and the rotor is much smaller than it would have been if the ball bearing mounted annulus 80 were not employed. Thus the friction losses in the low pressure zone are also greatly reduced.

In order to control the operation of the motor the inlet 14 is provided with a valve for controlling the amount of fluid that enters the space 49. For this purpose the disk 51 is provided with an integral upstanding sleeve 94 which surrounds the inlet 14. The sleeve 94 has a lateral opening 95. A valve cup 96 having an opening 97 encircles sleeve 94 and closes its upper end and is provided with a stem 98 for rotating it to adjust the size of the overlapping portion of the openings 95, 97 to control the flow of operating fluid or to close off the valve and stop the motor. The cap 99 is bolted to plate 51 by screws 100. The cap has the nipple 101 for connection to the source of fluid and an opening 102 which registers with opening 95.

Figure 10:
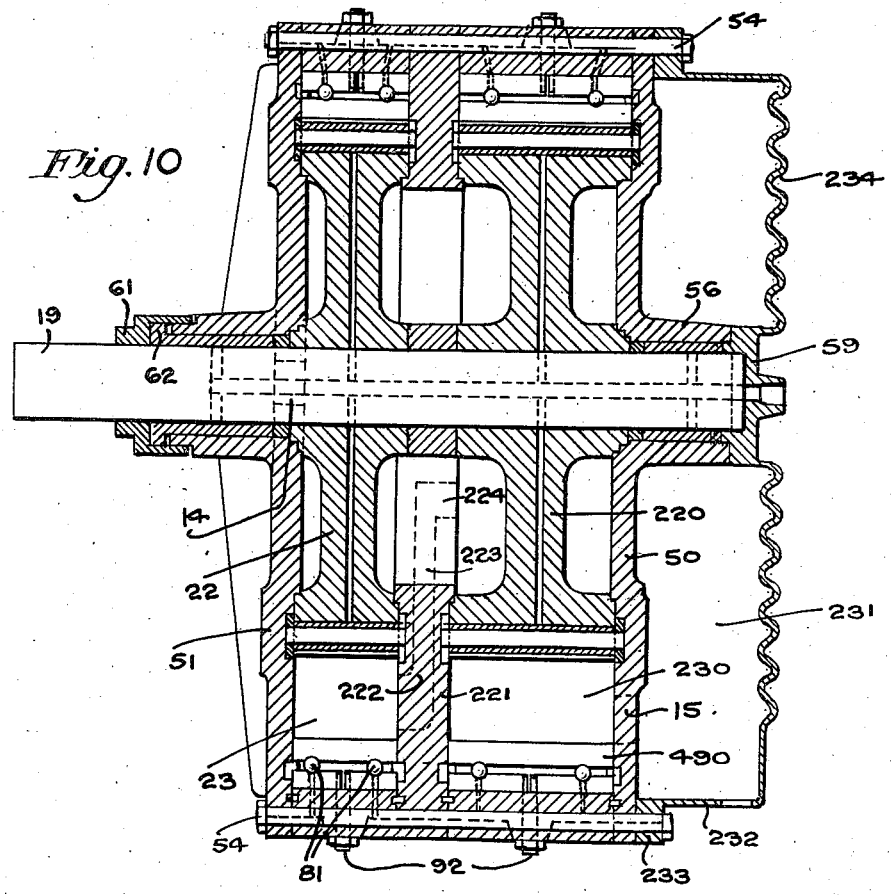
Fig. 10 is a sectional view of the invention as embodied in the two-stage engine.

Fig. 10 illustrates the present invention embodied in a two stage engine or motor. Briefly in this two stage motor the fluid enters the first stage and while still under substantial compression it exhausts into the second stage and thence to atmosphere or to a condenser, if the source of power is steam.

In Fig. 10 the elements or parts which are identical with the corresponding parts in the single stage motor shown in Figs. 1 to 9 are indicated by the same reference character.

Thus the two stage motor has two rotors 22 and 220 which are separated by a spacer 221, and the shaft 19 passes through both rotors and is spliced to both rotors. The inlet 14 for the first stage is indicated by dotted lines in the stator plate 51. At about a quadrant distant the outlet from stage 1 is in the spacer 221 as shown in dotted lines at 222. The spacer 221 has an arcuate interior passage 223 running parallel to its side walls, which opens at 224 into the space 490 of the second stage motor. Thus the compressed fluid first does work in the first stage and then enters the second stage at this reduced pressure. Because the pressure is reduced the vanes 230 of the second stage are wider so that the reduced pressure multiplied by the greater area of the vanes 230 will result in the production of work by each vane 230 which approximates the work done by vane 23 in the first stage.

The stator disk 50 has the exhaust port 15. The embodiment shown in Fig. 10 may be employed with compressed air but it is provided with a condenser chamber 231 so that if steam is employed, it may be condensed before it is exhausted to the atmosphere. The chamber 231 is formed by the cylindrical side wall 232 which has an annular flange 233, which is bolted against the stator disk 50 by the bolts 54. The end wall of the chamber 231 is in the form of an annularly corrugated disk 234 which may be integral with the side wall 232. The end wall 234 has a central opening and its edge is preferably clamped between the cap 59 and the journal box 56.

It will be understood, of course, that various changes and modifications may be made in the construction shown in the drawings and as hereinbefore described without departing from the general principles or real spirit of the present invention, and it is intended to claim the same broadly as well as specifically as indicated in the appended claims.

I claim:

1. A fluid motor having in combination a pair of spaced disks, each disk having an eccentric journal box, an annular member disposed between the peripheral portions of said disks and assembled therewith to form a fixed stator, a freely rotatable annulus disposed within said stator and spaced from said annular member, said annulus having a pair of parallel ball bearing race grooves on its outer face, a pair of laterally spaced rings disposed between said annulus and said annular member, each having a ball bearing race groove on its inner face in approximate registry with one of said ball bearing races on said annulus, two courses of ball bearings interposed between said rings and said annulus, means for adjusting the rings to compensate for wear, and a rotor fixed on said shaft, said rotor comprising a circular plate and a plurality of impeller vanes pivoted on the periphery of said plate, the toe portions of said vanes operating against the annulus and causing its rotation.

2. A fluid motor having in combination a pair of spaced disks, each disk having an eccentric journal box, an annular member disposed between the peripheral portions of said disks and assembled therewith to form a fixed stator, a freely rotatable annulus disposed within said stator and spaced from said annular member, said annulus having a pair of parallel ball bearing race grooves on its outer face, a pair of laterally spaced rings disposed between said annulus and said annular member, each having a ball bearing race groove on its inner face in approximate registry with one of said ball bearing races on said annulus, two courses of ball bearings interposed between said rings and said annulus, a series of radial screws carried by said annular member, the ends of said screws being tapered and disposed between said rings, said screws thus serving as means for adjusting the rings to compensate for wear, a rotor fixed on said shaft, said rotor comprising a circular plate and a plurality of impeller vanes pivoted on the periphery of said plate, the toe portions of said vanes operating against the annulus and causing its rotation, and a flexible gasket carried by each vane for sealing engagement with the inner face of said annulus.

3. A fluid motor having in combination a pair of spaced disks, each disk having an eccentric journal box, an annular member disposed between the peripheral portions of said disks and assembled therewith to form a fixed stator, a freely rotatable annulus disposed within said stator and spaced from said annular member, said annulus having a pair of parallel ball bearing race grooves on its outer face, a pair of laterally spaced rings disposed between said annulus and said annular member, each having a ball bearing race groove on its inner face in approximate registry with one of said ball bearing races on said annulus, two courses of ball bearings interposed between said rings and said annulus, a series of radial screws carried by said annular member, the ends of said screws being tapered and disposed between said rings, said screws thus serving as means for adjusting the rings to compensate for wear and a rotor fixed on said shaft, said rotor comprising a circular plate, a pair of annular bands disposed on the lateral faces of said plate, a plurality of radial impeller vanes carried by said plates, the toe portions of said vanes operating against the annulus and causing its rotation, each vane having a flexible gasket for sealing engagement with the inner face of said annulus, said disks having an inlet opening and an outlet opening.

HENRY J. SHARP.

REFERENCES CITED

The following references are of record in the file of this patent:

UNITED STATES PATENTS

| Number | Name | Date |
|---|---|---|
| 8,686 | Huse | Jan. 27, 1852 |
| 800,633 | Dengler | Oct. 3, 1905 |
| 864,979 | Mosher | Sept. 3, 1907 |
| 1,638,944 | Ljungström | Aug. 16, 1927 |
| 1,664,987 | Meyer | Apr. 3, 1928 |
| 1,966,892 | Hamren | July 17, 1934 |
| 2,081,812 | Hapkins | May 25, 1937 |
| 2,153,587 | Parreira | Apr. 11, 1939 |
| 2,316,788 | Hamren | Apr. 20, 1943 |

FOREIGN PATENTS

| Number | Country | Date |
|---|---|---|
| 586,312 | France | Jan. 3, 1925 |
| 15,855 | Great Britain | July 6, 1912 |